April 20, 1965   W. F. UNDERWOOD ETAL   3,179,326
METHOD FOR FORMING UNIAXIALLY ORIENTED FILMS
AND THE PRODUCT FORMED THEREBY
Filed July 21, 1960   2 Sheets-Sheet 2
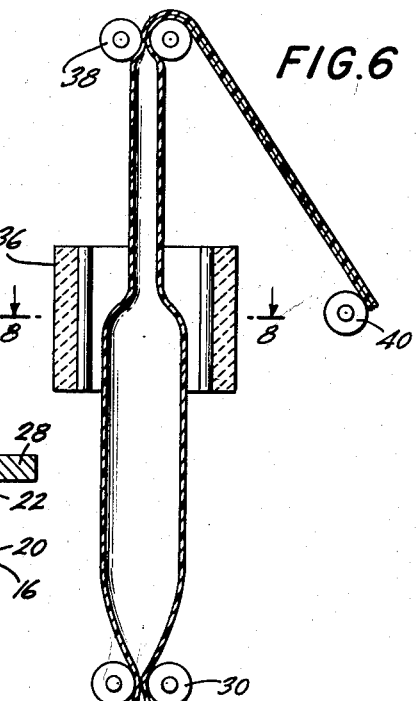
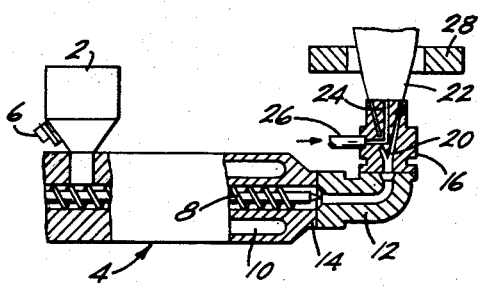
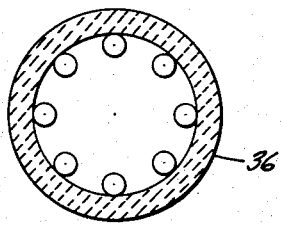
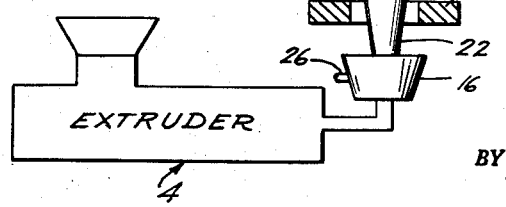
INVENTORS
WILLIAM F. UNDERWOOD
WILLIAM SACKS
BY
ATTORNEY United States Patent Office 3,179,326
Patented Apr. 20, 1965

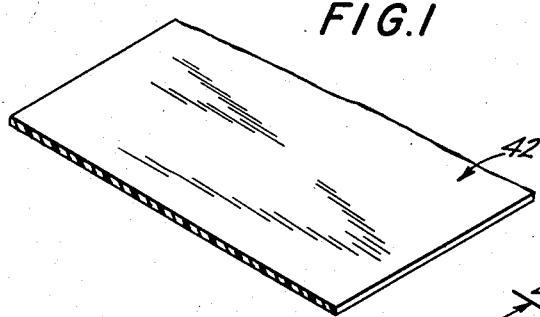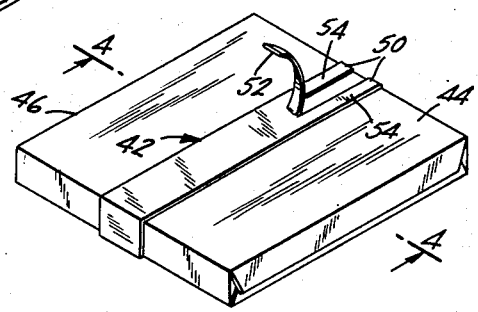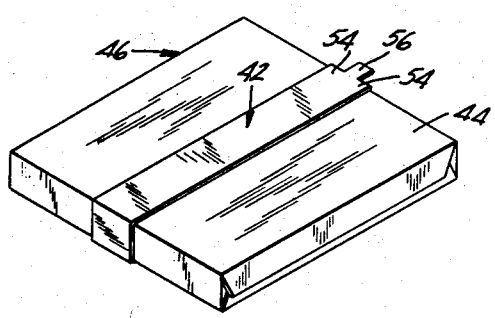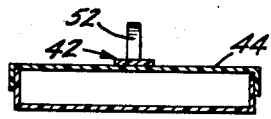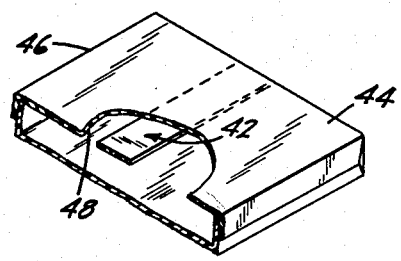

3,179,326
METHOD FOR FORMING UNIAXIALLY ORIENTED FILMS AND THE PRODUCT FORMED THEREBY
William F. Underwood, Oak Park, and William Sacks, Park Forest, Ill., assignors to Union Carbide Corporation, a corporation of New York
Filed July 21, 1960, Ser. No. 44,295
16 Claims. (Cl. 229—51)

This invention relates to a uniaxially oriented crystalline polyolefin film and a method for forming the same. More particularly, this invention relates to the uniaxially oriented crystalline polyolefin film preferably used as heat sealable tear tapes for thermoplastic wrapping films.

The use of tear tapes for opening a package, and the easy openability which such tapes provide a package is well known. This method has found great use for packages wrapped in paper and cellulosic film as for example chewing gum and cigarettes. However, the inability of finding an adequate tear tape for flexible, thermoplastic film, particularly, polyethylene film has greatly hampered the success of thermoplastic film as a wrapping or packaging material. This difficulty is largely attributable to the fact that polyethylene film is more extensible than cellulosic film and does not uniformly shear with known tear tapes. Consequently, while cellulosic film shears easily and leaves smooth edges on the sides of the tear with known tear tapes, this does not occur with polyethylene film and the like. Rather, the tears are erratic, wandering from the desired path into the body of the film, thus destroying package integrity. This results in a non uniform serrated edges on the sides of the tear characterized by badly stretched film and uneven valleys of smoothly sheared film.

It is an object of this invention to provide a new and improved tear tape for opening thermoplastic wrapping film without adversely affecting said film.

Another object of this invention is to provide a highly uniaxially oriented crystalline polyolefin film for use as a tear tape.

Another object of this invention is to provide a method for forming the highly uniaxially oriented crystalline polyolefin film.

Other and additional objects of this invention will become apparent hereinafter.

According to the present invention the tear tape comprises a highly uniaxially oriented crystalline polyolefin film heat bondable or sealable to a packaging film and preferably to a thermoplastic packaging film. The tear tape of this invention is characterized in that when it is notched and pulled from the tear tape sealed area of the packaging film within its boundaries and in the direction of orientation, it tears the packaging film conterminous therewith uniformly along a substantially straight line parallel to the direction of orientation of the tear tape without wandering into the packaging film.

The film for the tear tape is prepared from a film-forming crystalline polyolefin and oriented by preferably stretching it at least 700% in one direction at a temperature below the melting point of the polyolefin and above its draw point temperature. The resultant uniaxially oriented crystalline polyolefin film has a fiber like orientation therewithin which gives it tremendous tensile strengths of the order of 30,000 p.s.i. to 89,000 p.s.i. in the direction of orientation.

Plastic materials suitable for the production of such highly uniaxially oriented films are preferably crystalline film-forming polyolefins having a melting point above 125° C. Polyolefins such as high density polyethylene of 0.94 and above, polypropylene, polybutene, mixtures of polyethylene and polypropylene, and copolymers of ethylene, propylene and butene can be used. Film-forming crystalline olefin polymers can also be prepared by polymerizing ethylene and/or propylene with other polymerizable monomeric olefins such as vinyl chloride and vinyl acetate.

A preferred method of forming the highly uniaxially oriented crystalline polyolefin film is by continuously extruding a molten highly crystalline polyolefin material in the form of seamless tubing, continuously withdrawing the tubing from the point of extrusion and flattening the tubing at a point spaced from the point of extrusion, while maintaining a substantially constant, continuous, isolated bubble of a gaseous medium in that section of the tubing between the point of extrusion and the point of flattening. The tubing at the point of initial expansion is in a formative plastic state such that it is in the unset condition and is capable of being enlarged and thinned out, i.e., above the melting point of the particular polyolefin employed. The pressure of the gaseous medium constituting the bubble is such as to inflate the tubing in this formative plastic state to a diameter greater than that of the tubing at the point of extrusion. At the point of extrusion, the tubing is passed through a fluid medium of such temperature as to cool the tubing to an extent that when the tubing has been inflated by said bubble to the determined diameter it will be in a set condition.

Uniaxial orientation of the crystalline polyolefin tubing is then accomplished by maintaining in the tubing an isolated bubble of gaseous medium while feeding said tubing through a heated zone. The heat from said zone heats the tubing to a temperature above which it is drawable and below which it melts, and while drawable the tubing is uniaxially oriented by stretching it in the longitudinal direction. The resultant uniaxially crystalline polyolefin tubing is characterized in that when a tear is initiated therein it will follow a substantially straight line parallel to the direction of orientation. Preferably, the tear in said tubing will not deviate from a straight line by an amount not greater than one-half inch per foot of tear.

The nature of the invention and the manner in which it may be practiced will become clear from the detailed description when taken in conjunction with the accompanying drawings forming this specification and wherein:

FIGURE 1 is a perspective view of a short length of the uniaxially oriented crystalline polyolefin film showing an exaggerated cross section thereof;

FIGURE 2 is a perspective view of a package overwrapped with thermoplastic film having bonded to its exterior surface a tear tape which has been notched and partially torn open;

FIGURE 3 is a perspective view of a package overwrapped with thermoplastic film having bonded to its exterior surface a tear tape which has a tab;

FIGURE 4 is a cross section of FIGURE 2 taken along the line 4—4;

FIGURE 5 is a perspective view of a fragmentary portion of a package overwrapped with thermoplastic film having a tear tape bonded to its interior surface;

FIGURE 6 is a schematic illustration showing the continuous production of crystalline polyolefin tubing and the subsequent uniaxial orientation thereof;

FIGURE 7 is a detailed view of the extruder illustrated in FIGURE 6; and

FIGURE 8 is cross section of the radiant heater shown in FIGURE 7 taken along the lines 8—8.

Referring now to the drawings, wherein like reference numerals designate like parts except as otherwise indicated, and first to FIGURE 6 in which a crystalline polyolefin, such as high density polyethylene, is fed through hopper 2 into a conventional extruder 4, wherein it is heated to an appropriate temperature, e.g., 50° C. to 70° C. above the melting point of the polymer to cause the melting thereof. An electric vibrator 6 of known construction cooperates with the hopper 2 to accelerate the feed of the crystalline polyolefin material into the extruder. As the crystalline polyolefin material is fed through the extruder by a screw 8, rotated by known means, not shown, it is molten. The extruder is provided with a jacketed chamber 10 through which a heating medium is circulated. In such condition the crystalline polyolefin material is fed into an elbow 12 bolted to the head 14 of the extruder. A die 16 is secured in any appropriate manner to the outlet end of the elbow 12 and the molten crystalline polyolefin material passes thereinto. The die 16 is provided with an annular orifice 20 from which the viscous crystalline polyolefin mass emerges in the form of seamless tubing 22. The die 16 is also provided with a central orifice 24 which is connected to an air supply 26, whereby the seamless tubing 22 is inflated by introducing air into the interior thereof in sufficient quantity to give the desired diameter. The air supply 26 is provided with a valve, not shown, so that when the desired quantity of air has been introduced within the seamless tubing, further supply thereof can be prevented. In the event the quantity of the air decreases, as for example by leakage or otherwise, the requisite quantity of air can be added by proper manipulation of the valve. The inflated seamless tubing 22 is drawn upwardly and interiorly through a cooling ring 28 by a pair of rotating squeeze rolls 30 which also serve to collapse the tubing and retain the inert gaseous medium e.g., air, at the point described. Cooling fluid, such as air, is supplied to the cooling ring 28 from both ends thereof and it passes therefrom through perforations onto the exterior surface of the tubing. The stream of cooling air constitutes a cooling zone serving to chill or set the expanding plastic tube to the desired diameter.

The seamless tubing thus obtained is then uniaxially stretched to obtain a film having uniaxial orientation by drawing the seamless tubing from the squeeze rolls 30 vertically upward through a heating device 36 by a pair of counter-rotating rolls 38. A bubble of gaseous medium, such as air, is maintained within the seamless tubing between the pair of squeeze rolls 30 and 38 to prevent the tubing from collapsing. In the heating device 36 the seamless tubing 22 is heated to a temperature above which the film becomes drawable and orients when stretched, but below which the film merely thins out when stretched without appreciable orientation. Preferably the film is heated to a temperature from about 5° C. to 25° C. below its melting point. The peripheral speed of squeeze rolls 38 is desirably sufficiently greater than that of squeeze rolls 30 to stretch the seamless tubing at least 700% for orientating it in the machine direction while in its drawable condition. The highly uniaxially oriented crystalline polyolefin seamless tubing is then collapsed by the squeeze rolls 38 as it is drawn therebetween. After passing through the squeeze rolls 38 the oriented crystalline polyolefin tubing is wound on wind-up reel 40, which is actuated so as not to impart additional stretch to the tubing as it is wound.

The cylindrical heating device 36 as illustrated in FIGURE 8 is comprised essentially of a series of resistance elements equally spaced about the circumference of the heater and controlled by a known transformer type control (not shown). The internal diameter of the heater is sufficiently large to allow the tubing in its inflated condition to pass therethrough with clearance. Although the process has been described using radiant heating, other means of heating, such as infra-red, hot air, dielectric heating, and steam, for example, can also be employed.

It is to be noted that the factors affecting the amount of stretch and orientation in the machine direction of the tubing in general include the ratio of peripheral speeds of squeeze rolls 38 to squeeze rolls 30, commonly called the draw ratio, and the temperature to which the tubing is subjected. It has been found in practicing the preferred method, for any given temperature of orientation, there appears to be a minimum draw ratio at which a high oriented film can be obtained which can be easily determined by those skilled in the art. Draw ratios below this minimum produce partially oriented films, which, when used as tear tapes, do not tear in smooth, straight, parallel lines. Additionally, since the draw ratios are directly related to the orientation temperatures, suitable draw ratios and temperatures to obtain highly uniaxially oriented films will be dependent upon the nature of the resin crystalline polyolefin used which also can be easily determined by those skilled in the art. Also in its passage through the heating device 36 the seamless tubing becomes drawable and stretches in the machine direction at a well defined point herein referred to as the draw point. The horizontal axis of the draw point will tend to rise upwardly in the heating device if the temperature is lowered or if the linear velocity of the tubing through the heater is increased. Conversely, the horizontal axis of the draw point will be lowered if the temperature is raised or the linear velocity of the film through the heater is decreased.

The draw point of crystalline polyolefin films, such as films formed from high density polyethylene, occurs within a narrow temperature range. For stretching crystalline polyethylene tubing having a high density of 0.94 to 0.98 the desired results are obtained by heating the crystalline polyethylene tubing to a preferred temperature in the range from about 5° C. to 25° C. below its melting point. Stretching the crystalline polyethylene tubing in the machine direction below a temperature of about 25° C. below its melting point results in irregular orientation of the tubing leaving areas that are unoriented. Stretching the crystalline polyethylene tubing in the machine direction at temperatures above its melting point results in mere thinning out of the tubing without substantial orientation occurring. It is to be noted the measured temperatures used in the process are obtained by means of a thermocouple placed in the heating device and held in contact with the outside surface of the tubular film at its draw point.

To obtain the desired uniaxial orientation, the crystalline polyolefin film is preferably stretched in the machine direction at least 700 percent. The optimum stretch in the machine direction will be dependent on such factors as the nature of the crystalline polyolefin used for forming the film, the temperature of the film when it is oriented, the prior orientation history of the film, the tensile strength of the film, and the apparatus used for stretching.

In the embodiment wherein a highly uniaxially oriented film is prepared from crystalline polyethylene having a density of 0.96, it is preferred to stretch the film at least 900%. It was found that stretching the film at least 900% or greater produced a film which is clear and glossy. Stretching the film 700% produced a film which had appreciable haziness. However, the film, when stretched 700% nevertheless produced a satisfactory tear tape. In the case of crystalline polyethylene having a density of 0.96, it was found that after the film had been oriented to produce a satisfactory tear tape, further orientation of the film resulted in increased machine directional tensile strength and improved gloss.

The preferred minimum amount of uniaxial stretching is such that the resultant highly oriented crystalline polyolefin film pass the following tests when used as a tear tape. When the tear is initiated within the boundaries of the tear tape and in the direction of orientation it will not deviate from a straight line by an amount not greater than ½ inch per foot of tear. In contrast, when the film is not fully oriented, there will be a sudden resistance to the tear action. Increased force will cause the tear to deviate from the initiated straight line, and the tear then may or may not continue along the deviated line.

Plastic materials suitable for the production of such highly uniaxially oriented films are preferably crystalline film-forming polyolefins having a melting point above 120° C. Polyolefins such as high density polyethylene of 0.94 and above, polypropylene, polybutene, mixtures of polyethylene and polypropylene, and copolymers of ethylene, propylene and butene can be used. Film-forming polymers can also be prepared by polymerizing ethylene and/or propylene with other polymerizable monomeric olefins such as vinyl chloride and vinyl acetate.

The details and manner of practicing the preferred method invention will become apparent from the following examples, it being understood that the examples are illustrative thereof and that the scope of the invention is not restricted thereto other than as set forth in the appended claims.

Example 1

A highly uniaxially oriented crystalline polyolefin tubular film was formed by using apparatus as illustrated in FIGURES 6 and 7 of the drawings. The crystalline polyolefin consisted of a film-forming polyethylene resin having a density of 0.96 and a melt index of 0.7 at 190° C. which was extruded as seamless tubing by the blown tube extrusion method herein described. The tubular film thus produced was 10 mils in thickness and 2 inches in flat width. Thereafter the tubular film was oriented in the machine direction only by drawing it vertically upward from the squeeze rolls which flattened the formed tubular film through a radiant heating device by a pair of counter-rotating rolls positioned above the heating device. A bubble of air was maintained within the tubular film between the sets of squeeze rolls to prevent it from collapsing. The draw ratio of the squeeze rolls above the heating device to the squeeze rolls therebelow was 10. This caused the crystalline polyethylene tubular film to be stretched 900 percent in the machine direction as it reached a temperaturre of 90° C. within the heating device. The uniaxially oriented tubular film was 1.2 mils in thickness, and was wound upon a reel. The highly uniaxially oriented tubular film in the machine direction had a tensile strength of 55,000 pounds per square inch and elongated 20 percent at the breaking point.

Example 2

The procedure set forth in Example 1 was repeated except that the crystalline polyolefin was a film-forming polyethylene resin having a density of 0.95 and a melt index of 0.7 at 190° C. The tubular film produced by the blown tube extrusion method was 8 mils in thickness and 2 inches in flat width. The draw ratio of the pairs of squeeze rolls was 10 which caused the tubular film to be stretched 900 percent in the machine direction as it reached a temperature of 93° C. within the heating device. The resultant uniaxially oriented film was 2.8 mils in thickness, and was wound upon a reel. The highly uniaxially oriented crystalline polyethylene tubular film in the machine direction had a tensile strength of 33,000 pounds per square inch and elongated 75 percent at the breaking point.

Example 3

The procedure set forth in Example 1 was repeated except that the crystalline polyolefin was a film-forming polypropylene resin having a density of 0.90 and a melt index of 0.3 at 190° C. The tubular film produced by the blown tube extrusion method was 11 to 12 mils in thickness and 2 inches in flat width. The draw ratio of the pairs of squeeze rolls was 10 which caused the tubular film to be stretched 900 percent in the machine direction as it reached a temperature of 90° C. within the heating device. The resultant uniaxially oriented film was 3.6 mils in thickness, and was wound upon a reel. The highly uniaxially oriented crystalline polypropylene tubular film in the machine direction had a tensile strength of 64,000 pounds per square inch and elongated 20 percent at the breaking point.

For purposes of comparison a crystalline polyolefin consisting of a film-forming polyethylene resin having a density of 0.957 and a melt index of 0.75 at 190° C. was formed by the blown tube extrusion method herein described. The resultant tubular film was 0.7 mil in thickness and 2 inches in flat width. The resultant tubular film was not thereafter oriented. Rather it was wound directly upon a reel. The unoriented crystalline polyethylene tubular film in the machine direction had a tensile strength of 6,200 pounds per square inch and elongated 350 percent at the breaking point.

As a further comparison the crystalline polyethylene tubular film formed in the foregoing control sample instead of being wound on a reel after being formed was biaxially oriented. This was accomplished by drawing the flattened tubular film from the squeeze rolls which flattened the formed tubular film through a heating device by another pair of squeeze rolls positioned thereabove. A bubble of air was maintained between the two sets of squeeze rolls to inflate the tubing which radially distended the tubing as it reached a temperature of 125° C. within the heating device. The draw ratio of the two sets of rolls was 5 in order to take up the slack due to radially distention of the tubular film and to impart additional stretch in the machine direction. The stretching of the tubular film in both the transverse and machine direction was 400 percent. The biaxially stretched tubular film was 0.4 mil in thickness and was wound upon a reel. The biaxally oriented tubular film in the machine direction had a tensile strength of 23,500 pounds per square inch and elongated 110 percent at its breaking point.

Thus, the Examples 1, 2 and 3 dramatically illustrate the significant increase in tensile strength and decrease in elongation at the breaking point in the direction of orientation of a highly uniaxially oriented crystalline polyolefin film formed by the practice of this invention over similar properties of first, an unoriented crystalline polyolefin film and second, a biaxially oriented crystalline polyolefin film. The tremendous tensile strength and decrease in elongation of the highly uniaxially crystalline polyolefin film makes it admirably suited for tear tapes in that tear tapes made from the highly uniaxially oriented crystalline polyolefins of Examples 1, 2 and 3 uniformly tear from thermoplastic packaging film along a substantially straight line without wandering thereinto and thus do not destroy package integrity. In comparison tear tapes made from the unoriented or biaxially oriented crystalline polyolefin were found not to be suitable because they either could not be torn from the thermoplastic packaging film or if tearable they wandered into the thermoplastic packaging film and thereby destroyed its integrity.

Although it is preferred to form the uniaxially oriented crystalline polyolefin film in a continuous process as hereinbefore set forth, the seamless tubing can be formed by the described blown tube extrusion method and after leaving the squeeze rolls 38 wound upon a reel, not shown. Then the seamless tubing can be highly uniaxially oriented some time later by simply unwinding the seamless tubing and proceeding with the uniaxial orientation steps of the process described.

The highly uniaxially oriented crystalline film can be also formed by other methods which are known in the art. The crystalline polyolefins can be formed into film by such methods as slot extrusion, and by solvent casting. Thereafter the crystalline polyolefin film can be preferably stretched at least 700 percent in the machine direction by any suitable means such as spaced rolls, or drums driven at different speeds.

However forming the highly uniaxially oriented crystalline polyolefin by the preferred method, herein described, has certain advantages over the known method. First with the preferred method the entire crystalline polyolefin seamless tubing can be oriented without any loss due to edge trimming as would be the case in either the two roll stretch method or the tentering apparatus stretch method. Secondly, the preferred method of orientation of the crystalline polyolefin seamless tubing can be used in a continuous process in conjunction with the economical blown tube extrusion method.

After the highly uniaxially oriented crystalline polyolefin film is formed it can be slit into strips by any suitable means. The width of the strips, of course, is largely dependent on its application. As a tear tape the strip of uniaxially oriented crystalline polyolefin film is heat sealed to a thermoplastic wrapping film by bonding the tear tpe thereto with the application of heat and pressure by any suitable means. However, it has been found that a tear tape consisting of a highly uniaxially oriented crystalline polyolefin film has a tendency to shrink in the machine direction or direction of orientation when heat sealed to a thermoplastic wrapping film having a melting point appreciably below that of the tear tape film. This produces objectionable distortion of the thermoplastic wrapping film creating an unsightly and undesirable condition. Furthermore, it was found the sealing temperatures required to seal the highly uniaxially oriented tear tapes to some thermoplastic wrapping films resulted in some loss or removal of orientation in the tear tape which resulted in lower tensile strengths of the tear tape and difficulty in tearing in smooth, straight, parallel lines.

The tendency of the tear tape to shrink and thereby distort the thermoplastic wrapping film when heat sealed thereto has been greatly reduced by heat treating the highly uniaxially oriented film at a given temperature for a given period of time. For example, heating the highly uniaxially oriented crystalline polyethylene film of Example 1 to a temperature of 130° C. for 120 minutes while not under tension produces a tear tape which will shrink 5 percent if thereafter heated to a temperature of 130° C. Moreover, if the heat treating temperature is 135° C. the shrinkability of the tear tape is further reduced to only 3 percent if thereafter heated to a temperature of 130° C.

In comparison by not heat treating the highly uniaxially oriented polyethylene film of Example 1 shrinkability of the tear tape produced therefrom was 35 percent if thereafter heated to temperatures of 130° C. and 135° C.

Thus, by heat treating the highly uniaxially oriented crystalline polyolefin film, it becomes stabilized up to the heat treating temperature and when heat sealed to the thermoplastic wrapping film at temperatures below the heat treating temperature, a neat appearing thermoplastic wrapping film results.

Referring now to FIGURES 1–5 and first to FIGURE 1 wherein is shown the preferred application of the highly uniaxially film as a tear tape 42 which is heat heatable to a packaging film. If necessary the tear tape 42 can be heat treated to prevent distortion or wrinkling of the packaging film when it is heat sealed thereto.

The tear tape 42 is characterized in that when it is notched and pulled from the tear tape sealed area of the packaging film within its boundaries and in the direction of orientation, it tears the packaging film conterminous therewith, it tears uniformly along a substantially straight line parallel to the direction of orientation without wandering into the packaging film. The tear tape 42 readily passes the test herein described in that when the tear initiated in the direction of orientation it does not deviate from a straight line more than ½ inch per foot of tear.

The high orientation of the crystalline polyolefin film gives the tear tape great strength, i.e., 30,000 pounds to 80,000 pounds per square inch in the oriented direction, making it substantially less extensible than the thermoplastic films suitable for use as a packaging film.

In a preferred embodiment the tear tape 42 consists of a uniaxially oriented high density polyethylene film and is preferably applied to packaging film made from a film forming low density polyethylene, as from .91 to .925. A conventional impulse bar sealer can be employed to heat seal the the tear tape to the packaging film wherein the dwell time and temperature of the impulse bar sealer are regulated to form a satisfactory seal. As shown in FIGS. 2, 3 and 4, a tear tape 42 as above described has been heat sealed to the exterior surface 44 of a low density polyethylene packaging film 46 by the conventional impulse bar sealer. FIG. 5 illustrates a tear tape 42 as above described heat sealed to the interior surface 48 of the low density polyethylene packaging film 46. Of course, in any of the embodiments of the invention, the tearing action through the packaging film is in the direction of orientation of the crystalline polyolefin tear tape film.

Referring again to FIG. 2, which shows the tearing action of the tear tape 42 on the packaging film 46 when the tear tape 42 has been notched at 50 by means of a sharp instrument as a pair of scissors. Accordingly, when the strip 52 of the tear tape lying within the notches 50 is pulled from the packaging film 46 such strip 52 and that portion of the thermoplastic wrapping film conterminous therewith is lifted from the plane of the packaging film 46 in a highly uniform manner leaving a neat, nearly straight edge tear therein. The tear guides 54 on either side of the tear strip 52 and integral therewith prevent random tearing of packaging film and thus assists in preserving the integrity of the package.

FIG. 3 shows a package overwrapped with a thermoplastic film having heat sealed thereto a tear tape 42 with a tab 56. To open the package, the tab 56 is pulled up and towards the opposite end of the package. By such action, a neat, nearly straight edge tear in the packaging film will be formed as in the embodiment shown in FIG. 2. Integral tear guides 54 on either side of the tabbed portion thereof will again insure that package integrity will be maintained.

The tear tapes of this invention can be colored as by pigmenting or dyeing and the surfaces of these tear tapes can be metallized before or after orientation. Furthermore, the tapes of this invention may be treated before or after orientation, by any method known in the art such as by way of example flame treatment, ozone treatment, corona discharge treatment and chlorination.

While the packaging material in the foregoing embodiments has been exemplified by the low density polyethylene film other packaging materials can also be employed including thermoplastic films such as high density polyethylene, fibrous cellulose materials, such as paper, and non-fibrous films such as moisture-proof coated regenerated cellulose. Of course, any of the plastic materials suitable for the production of highly uniaxially oriented film can also be employed as a tear tape.

In addition to being ideally suited for a tear tape, such properties as a fiber-like orientation, tremendous tensile strength in the oriented direction and low extensibility make the highly uniaxially oriented crystalline film admirably suited for use as binding straps for wrapping boxes either as tubing or single wall tapes, rope, cordage, magnetic tapes and pressure sensitive tapes. Of course, the coated uniaxially oriented film may have to be further processed for these other applications. For example, as a pressure sensitive tape the film must be slit to the desired widths and have known adhesives applied to either surface thereof.

It is to be noted that the crystalline polyolefin film is preferably stretched at least 700 percent desirably 800 percent or greater in the longitudinal direction. The resultant uniaxially oriented film is not restricted to any thickness nor to any given width but is largely dependent on its intended application. Furthermore, the crystalline polyolefin film can be oriented immediately after extrusion or it can be wound upon a reel and oriented later. Or if a small amount of transverse strength is desired, the crystalline polyolefin film can be oriented in this direction prior to its being highly oriented in the machine direction.

Crystalline polyolefin film to be highly uniaxially oriented may or may not be irradiated.

Although the method of this invention has been described with reference to the stretching of tubular film, it will be appreciated by those skilled in the art that sheeting, made by slot extrusion or from slitting of tubular film, can also be uniaxially oriented using the teachings of this invention.

The following is a glossary of terms employed throughout the present specification:

*Melt index.*—ASTM Test D1238–52T; ASTM Standards, 1952, Part 6, p. 735. The flow rate is rate of extrusion in grams per 10 minutes (unless otherwise explicitly indicated).

*Melting point.*—Melting point is temperature at which the film will lose its birefringence when observed between crossed Nichol prisms on a hot stage microscope.

*Tensile strength.*—ASTM Test D 882–54T–C; ASTM Standards of Plastics, October 1955, p. 222, Scott Inclined Plane Tensile Strength Tester. A sample one inch long by ½ inch is used. Tensile strength is given in pounds per square inch based or original cross-section area of the sample.

*Elongation.*—ASTM Test D 882–54T–C; ASTM Standard on Plastics, October 1955, p. 222. Determined on same machine and sample as tensile strength.

*Temperature.*—Temperature of the tubular film measured by means of a thermocouple placed within the heating device and held in contact with the outer surface of the tubular film at the draw point.

*Density.*—Of crystalline polyolefin measured in grams per cubic centimeter in a gradient column made up of water, methonol and sodium acetate at 25° C.

Draw ratio =

$$\frac{\text{output speed of film}}{\text{input speed of film}}$$

Percent stretch =

$$\frac{\text{output speed} - \text{input speed}}{\text{input speed}}$$

The speeds of the film travels are those on entry into the orientation zone (input speed) and on exit from the orientation zone (output speed).

Since it is obvious that various changes and modifications may be made in the foregoing description without departing from the nature and spirit thereof, it is to be understood that the invention is not limited thereto except as set out in the appended claims.

What is claimed is:

1. A tear tape for producing a uniform tear in a packaging material comprising a highly uniaxially oriented crystalline polyolefin film heat sealed to said packaging material and characterized in that when a tear is initiated within the boundaries of said film and in the direction of orientation it will uniformly tear along a substantially straight line parallel to the direction of orientation.

2. A tear tape for producing a uniform tear in an extensible thermoplastic packaging film comprising a highly uniaxially oriented crystalline polyolefin film heat sealed thereto characterized in that said crystalline polyolefin film has been stretched at least 700 percent in the oriented direction and in that when a tear is initiated within the boundaries of said tear tape and in the direction of orientation it will follow a substantially straight line parallel to the direction of orientation.

3. In a package, a thermoplastic wrapping film, and a tear tape of highly uniaxially oriented crystalline polyolefin film stretched at least 700 percent in the longitudinal direction heat sealed to said thermoplastic wrapping film, said tear tape being characterized in that when a tear is initiated within the boundaries of said highly uniaxially oriented crystalline polyolefin film and in the direction of orientation it will uniformly tear along a substantially straight line parallel to the direction of orientation.

4. A packaging material comprising an extensible thermoplastic wrapping film, and a tear tape of highly uniaxially oriented crystalline polyolefin film stretched at least 700 percent in the longitudinal direction heat sealed to said extensible thermoplastic wrapping film, said tear tape being characterized in that when a tear is initiated within the boundaries of said highly uniaxially oriented crystalline polyolefin film and in the direction of orientation it will uniformly tear along a substantially straight line parallel to the direction of orientation without wandering into said thermoplastic wrapping film.

5. A packaging material comprising a low density polyethylene wrapping film, and a tear tape of highly uniaxially oriented film essentially consisting of film-forming polyethylene having a density of at least 0.94 heat sealed to said low density polyethylene wrapping film, said tear tape being characterized in that when a tear is initiated within the boundaries of said highly uniaxially oriented high density polyethylene film and in the direction of orientation it will uniformly tear along a substantially straight line parallel to the direction of orientation without wandering into said low density wrapping film.

6. A pressure sensitive tape comprising a highly uniaxially oriented crystalline polyolefin film, and a pressure sensitive adhesive on at least one surface of said film, said film being characterized in that when a tear is initiated within its boundaries and in the direction of orientation it will uniformly tear along a substantially straight line parallel to the direction of orientation.

7. The method which comprises passing a continuous length of seamless tubular film essentially consisting of film-forming polyethylene having a density of at least 0.94 through a heated zone while introducing and maintaining in said seamless tubular film a continuous isolated bubble of fluid medium for preventing it from collapsing, and stretching said seamless tubular film at least 700 percent in the longitudinal direction to cause orientation thereof in said direction, the heat in said zone heating the seamless tubular film to a temperature below which it melts and above which it is drawable to cause the high uniaxial orientation.

8. The method which comprises passing a continuous length of seamless tubular film essentially consisting of film-forming crystalline polypropylene through a heated zone while introducing and maintaining in said seamless tubular film a continuous isolated bubble of fluid medium for preventing it from collapsing, and stretching said seamless tubular film at least 700 percent in the longitudinal direction to cause orientation thereof in said direction, the heat in said zone heating the seamless tubular film to a temperature below which it melts and above which it is drawable to cause the high uniaxial orientation.

9. In a method for forming a highly uniaxially oriented crystalline polyolefin film, the steps which comprise melt-extruding a film-forming crystalline polyolefin in the form of seamless tubular film, continuously withdrawing the seamless tubular film from the point of extrusion, flattening the seamless tubular film at a predetermined distance from the point of extrusion while maintaining a bubble of fluid medium under pressure in the seamless tubular film between the point of extrusion and the point of flattening to cause distention thereof, passing a continuous length of the formed seamless tubular film through a heated zone while introducing and maintaining a bubble of fluid medium for preventing it from collapsing, and stretching the seamless tubular film at least 700 percent in the longitudinal direction, the heat in said zone heating the seamless tubular film to a temperature below which it melts and above which it is drawable to cause the high uniaxial orientation.

10. In a method for forming a highly uniaxially oriented high density polyethylene film, the steps which comprise melt-extruding film-forming polyethylene having a density of at least 0.94 in the form of seamless tubular film, continuously withdrawing the seamless tubular film from the point of extrusion, flattening the seamless tubular film at a predetermined distance from the point of extrusion while maintaining a bubble of fluid medium under pressure in the seamless tubular film between the point of extrusion and the point of flattening to cause distention thereof, passing a continuous length of the seamless tubular film through a heated zone while introducing and maintaining a bubble of fluid medium for preventing it from collapsing, and stretching the seamless tubular film at least 700 percent in the longitudinal direction, the heat in said zone heating the high density polyethylene seamless tubular film to a temperature below which it melts and above which it is drawable to cause the high uniaxial orientation.

11. In a method for forming a highly uniaxially oriented polypropylene film, the steps which comprise melt extruding film-forming polypropylene in the form of seamless tubular film continuously withdrawing the seamless tubular film from the point of extrusion, flattening the seamless tubular film at a predetermined distance from the point of extrusion while maintaining a bubble of fluid medium under pressure in the seamless tubular film between the point of extrusion and the point of flattening to cause distention thereof, passing a continuous length of the seamless tubular film through a heated zone while introducing and maintaining a bubble of fluid medium for preventing it from collapsing, and stretching the seamless tubular film at least 700 percent in the longitudinal direction, the heat in said zone heating the seamless tubular film to a temperature below which it melts and above which it is drawable to cause the high uniaxial orientation.

12. The method which comprises passing a continuous length of seamless tubular film essentially consisting of film-forming orientable polyolefin film through a heated zone while introducing and maintaining in said seamless tubular film a continuous isolated bubble of a fluid medium for preventing the seamless tubing from collapsing, and stretching said seamless tubular film in the longitudinal direction to cause orientation thereof in said direction, the heat in said zone heating the seamless tubular film to a temperature below which it melts and above which it is drawable to cause longitudinal orientation, the oriented polyolefin film being characterized in that when a tear is initiated therein it will follow a substantially straight line parallel to the direction of orientation.

13. The method which comprises passing a continuous length of seamless tubular film essentially consisting of film-forming polyolefin film through a heated zone while introducing and maintaining in said seamless tubular film a continuous isolated bubble of fluid medium for preventing the seamless tubing from collapsing, and stretching said seamless tubular film at least 700% in the longitudinal direction to cause orientation thereof in said direction, the heat in said zone heating the seamless tubular film to a temperature from about 5° C. to 25° C. below the temperature at which it melts and above the temperature at which it is drawable, to cause the longitudinal orientation.

14. The method which comprises passing a continuous length of seamless tubular film essentially consisting of film-forming polyethylene having a density of at least 0.94 through a heated zone while introducing and maintaining in said seamless tubular film a continuous isolated bubble of fluid medium for preventing the seamless tubing from collapsing, and stretching said seamless tubular film in the longitudinal direction to cause orientation thereof in said direction, the heat in said zone heating the seamless tubular film to a temperature from about 5° C. to 25° C. below the temperature at which it melts and above the temperature at which it is drawable to cause the longitudinal orientation.

15. In a method for forming a highly uniaxially oriented polyolefin film the steps which comprise melt-extruding a film-forming orientable polyolefin in the form of seamless tubular film, continuously withdrawing the seamless tubular film from the point of extrusion, flattening the seamless tubular film between a pair of rollers at a predetermined distance from the point of extrusion while maintaining a bubble of fluid medium under pressure in the seamless tubular film between the point of extrusion and the point of flattening to cause distention thereof, cooling said seamless tubing until said tubing attains a set condition, passing a continuous length of the formed seamless tubular film through a heated zone while introducing and maintaining a bubble of fluid medium for preventing the tubular film from collapsing, and flattening said seamless tubing between a pair of rollers, the two pairs of rollers having a draw ratio such that said tubing is stretched at least 700% in the longitudinal direction, the heat in said zone heating the seamless tubular film to a temperature below which it melts and above which it is drawable to cause the high uniaxial orientation.

16. In a method for forming a highly uniaxially oriented high density polyethylene film, the steps which comprise melt-extruding film-forming polyethylene having a density of at least 0.94 in the form of seamless tubular film, continuously withdrawing the seamless tubular film from the point of extrusion, flattening the seamless tubular film between a pair of rollers at a predetermined distance from the point of extrusion while maintaining a bubble of fluid medium under pressure in the seamless tubular film between the point of extrusion and the point of flattening to cause distention thereof, cooling the distended seamless tubing until said tubing attains a set condition, passing a continuous length of the set seamless tubular film through a heated zone while introducing and maintaining a bubble of fluid medium for preventing it from collapsing, and flattening said seamless tubing between a pair of rollers, said pairs of rollers having a draw ratio such that said tubing is stretched at least 700% in the longitudinal direction, the heat in said zone heating the high density polyethylene seamless tubular film to a temperature from about 5° C. to 25° C. below the temperature at which it melts and above the temperature at which it is drawable to cause the high uniaxial orientation.

References Cited by the Examiner
UNITED STATES PATENTS

| | | | |
|---|---|---|---|
| 2,227,682 | 1/41 | Wade | 18—57 |
| 2,395,419 | 2/46 | Mitchell | 117—68.5 |
| 2,461,975 | 2/49 | Fuller. | |
| 2,477,614 | 8/49 | Irons | 18—57 |
| 2,594,229 | 4/52 | Snyder. | |
| 2,679,969 | 6/54 | Ritchter | 229—3.5 |
| 2,699,285 | 1/55 | Bell | 229—51 |
| 2,714,562 | 8/55 | Hechtman | 117—68.5 |
| 2,719,100 | 9/55 | Banigan. | |
| 2,877,500 | 3/59 | Rainer. | |
| 2,952,395 | 9/60 | Spees | 229—51 |
| 2,956,723 | 10/60 | Tritsch | 229-3.5 XR |

GEORGE O. RALSTON, *Primary Examiner.*

EARLE J. DRUMMOND, *Examiner.*

UNITED STATES PATENT OFFICE
CERTIFICATE OF CORRECTION

Patent No. 3,179,326

April 20, 1965

William F. Underwood et al.

It is hereby certified that error appears in the above numbered patent requiring correction and that the said Letters Patent should read as corrected below.

Column 4, line 2, for "high" read -- highly --; column 7, line 12, for "tpe" read -- tape --; line 53, for "heatable" read -- sealable --; column 9, line 22, for "or" read -- on --.

Signed and sealed this 21st day of December 1965.

(SEAL)
Attest:

ERNEST W. SWIDER
Attesting Officer

EDWARD J. BRENNER
Commissioner of Patents